(12) United States Patent
Neustein et al.

(10) Patent No.: US 10,176,636 B1
(45) Date of Patent: Jan. 8, 2019

(54) AUGMENTED REALITY FASHION

(71) Applicant: A9.com, Inc., Palo Alto, CA (US)

(72) Inventors: Adam Moshe Neustein, San Francisco, CA (US); William Brendel, San Francisco, CA (US); Nityananda Jayadevaprakash, San Jose, CA (US); Zur Nehushtan, Mountain View, CA (US); Mark Jay Nitzberg, Berkeley, CA (US)

(73) Assignee: A9.com, Inc., Palo Alto, CA (US)

( * ) Notice: Subject to any disclaimer, the term of this patent is extended or adjusted under 35 U.S.C. 154(b) by 61 days.

(21) Appl. No.: 14/966,949

(22) Filed: Dec. 11, 2015

(51) Int. Cl.
*G06T 19/00* (2011.01)
*G06K 9/46* (2006.01)
*G06T 11/60* (2006.01)
*G06T 7/00* (2017.01)
*G06T 7/20* (2017.01)
*G06T 17/20* (2006.01)
*G06T 15/20* (2011.01)
*A41D 27/08* (2006.01)

(52) U.S. Cl.
CPC ............ *G06T 19/006* (2013.01); *A41D 27/08* (2013.01); *G06K 9/4604* (2013.01); *G06T 7/0085* (2013.01); *G06T 7/2033* (2013.01); *G06T 11/60* (2013.01); *G06T 15/205* (2013.01); *G06T 17/20* (2013.01); *G06T 2207/10016* (2013.01); *G06T 2215/16* (2013.01)

(58) Field of Classification Search
CPC ..... G06T 19/006; G06T 17/20; G06T 7/2033; G06T 15/205; G06T 7/0085; G06K 9/4604
See application file for complete search history.

(56) References Cited

U.S. PATENT DOCUMENTS

| 8,606,645 | B1* | 12/2013 | Applefeld | G06Q 30/02 705/14.25 |
|---|---|---|---|---|
| 2001/0026272 | A1* | 10/2001 | Feld | A41H 3/007 345/419 |
| 2009/0109214 | A1* | 4/2009 | Harvill | G06T 15/04 345/419 |
| 2011/0205242 | A1* | 8/2011 | Friesen | G06F 3/011 345/633 |
| 2013/0258117 | A1* | 10/2013 | Penov | G06K 9/6202 348/207.1 |
| 2014/0118396 | A1* | 5/2014 | Sugita | G06T 11/00 345/630 |
| 2014/0270540 | A1* | 9/2014 | Spector | G06T 7/60 382/199 |
| 2016/0188938 | A1* | 6/2016 | Summerfield | G06K 9/3216 235/439 |
| 2016/0343164 | A1* | 11/2016 | Urbach | G06T 19/006 |

* cited by examiner

*Primary Examiner* — Yuehan Wang
*Assistant Examiner* — Michael Le
(74) *Attorney, Agent, or Firm* — Hogan Lovells US LLP

(57) ABSTRACT

Various approaches discussed herein enable augmenting an image of a person wearing an article of clothing to provide an augmented reality (i.e., virtual) article of clothing to a viewer in order to overlay, replace, and/or augment an actual article of clothing being worn by the user. The augmented reality article of clothing is positioned on the user's real-world piece of clothing according to various markings and/or data that allow the augmented reality article of clothing to appear as if it were being worn by the user, even during movement of the user.

20 Claims, 12 Drawing Sheets

AUGMENTED REALITY FASHION

BACKGROUND

Increases in computer processing power, along with advanced graphics processors and three-dimensional (3-D) modeling techniques, have caused virtual reality to become part of the mainstream. From video games, to driving simulations, to navigational overlays, virtual reality is used by millions of people every day. As people increasingly become comfortable with using virtual and/or augmented reality applications, such as with portable and/or wearable computing devices, people will want to use the latest technology in real-time to express themselves with various changes to their appearance in a virtual world.

Virtual reality devices, such as headsets or goggles, are rapidly developing to the point where these devices should soon be widely available for various consumer applications. For example, virtual reality headsets that display images of a virtual world have been demonstrated at various events and application developers are preparing for their upcoming release. While these approaches satisfy some needs, they do not provide a truly immersive environment.

BRIEF DESCRIPTION OF THE DRAWINGS

Various embodiments in accordance with the present disclosure will be described with reference to the drawings, in which.

DETAILED DESCRIPTION

Figure 1A:
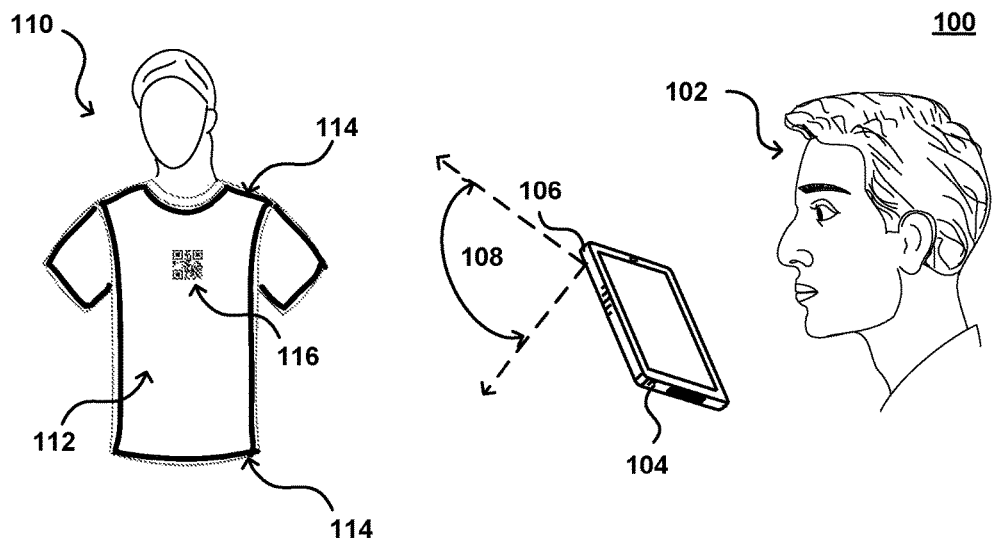
FIGS. 1A-1B illustrate example situations where a user can view augmented reality fashion, in accordance with various embodiments.

Systems and methods in accordance with various embodiments of the present disclosure may overcome one or more of the aforementioned and other deficiencies experienced in conventional approaches for providing an augmented reality viewing experience where different users may view the same person, for example through a computing device or virtual reality device (e.g., headset, goggles, glasses, contact lens, etc.) and see that person wearing articles of clothing with different appearances depending on any number of criteria. In particular, various embodiments enable a user to wear an article of clothing (e.g., a shirt, etc.) that in various embodiments may have a unique marker associated with it (e.g., a marker such as a QR code printed on the clothing or a signal being broadcast that, when received by a user for example, identifies the clothing and provides data, etc.) as well as having a contour marking around the outline of the clothing that, as discussed herein, is capable of defining an area of the clothing that can be replaced with augmented reality fashion data. Hereinafter, reference to "article of clothing" or a "shirt" or any other type of clothing should be understood to mean any article of clothing worn by a person and utilized according to the techniques described herein.

Various approaches discussed herein enable augmented reality fashion (e.g., enabling an article of clothing worn by a person in the real world to appear different when viewed in augmented/virtual reality) by obtaining original image data (e.g., through a camera of a computing device, through a virtual reality wearable device, etc.) that includes a representation of an article of clothing actually being worn by a person represented in the image data. In various embodiments, this original image data may be multiple frames of video data. The article of clothing will take on a particular appearance in the augmented reality, which is enabled in various embodiments by the actual article of clothing having certain features such as a unique marker and a contour marking, the operation of which will be described more fully herein.

According to various embodiments, a user may view a person wearing the clothing and see an "augmented" version of the clothing specified by the wearer, which may be a new color or pattern, or even what will appear to the user to be a new piece of clothing entirely. Augmented reality according to approaches described herein may be considered as identifying a masking area in image data, for example constrained by a reference marker and/or contour marking, that is inlaid with substitute image data that is provided to the display device in which the image data is being displayed. For example, a person can specify that a user who views them in augmented reality, according to the various embodiments described herein, will see a blue shirt in the image data being presented to them, even though the actual shirt being worn by the user may be white or some other color. In various embodiments, augmented clothing according to the techniques described herein may appear to show a picture, text, video, play audio, or even 3-D objects that offer various perspectives of the object in augmented reality according to a corresponding perspective of a viewer in relation to the marker on the shirt, for example. In some embodiments, a third party may offer certain benefits to a user who allows those third parties to display image data on their virtual "clothes," for example a credit or other type of payment, free virtual clothes, etc. Placement of his third party data may correspond to a specific reference marker, contour marking, or some other data.

For example, the techniques described herein would allow for a user to "virtually" change their clothes several times a day with the click of a button. A user may select various "virtual" clothes (e.g., through an app or a website, etc.), such as by logging into their account and selecting from a plethora of virtual clothing options. In various embodiments, other people (e.g., fashion experts, celebrities, etc.) may offer virtual clothing "collections" that can automatically be selected for a user, for example at various days, times, locations, etc. In various embodiments, a user can control what any random person might see them wearing in augmented reality, as well as specific users whose identities may be determined, for example by determining an identifier associated with a device that is linked to a person's identity. A user may assign specific virtual "outfits" to be seen by certain people or groups of people.

A determination may be made regarding a location of the reference marker that is represented in the image data, as well as a boundary of the clothing in the image data that substantially corresponds to the contour marking on the clothing. Using some combination of these and/or other features, a replacement area in the original image data is determined that is based on various data, such as the location of the reference marker as it relates to the boundary of the clothing in the image data. For example, the location of the reference marker is found in the image data and used as part of the approach to finding the edges of the boundary, such as by starting at the reference marker and working outward towards to periphery of the clothes as represented in the image data. Once a replacement area is determined, substitute image data, such as might be associated with the reference marker, is identified and used to create modified image data that corresponds to an overlay of the substitute image data on the original image data, the substitute image data being positioned in the replacement area and displayed substantially in real time as a user is viewing the person wearing the clothing.

Various conventional approaches can attempt to superimpose an article of clothing onto a representation of a person's body, but such approaches can be computationally expensive and not highly accurate. Various other applications, processes, and uses are presented below with respect to the various embodiments, each of which improves the operation and performance of the computing device(s) on which they are implemented, as well as improving the technology of virtual and/or augmented reality.

Figure 1B:
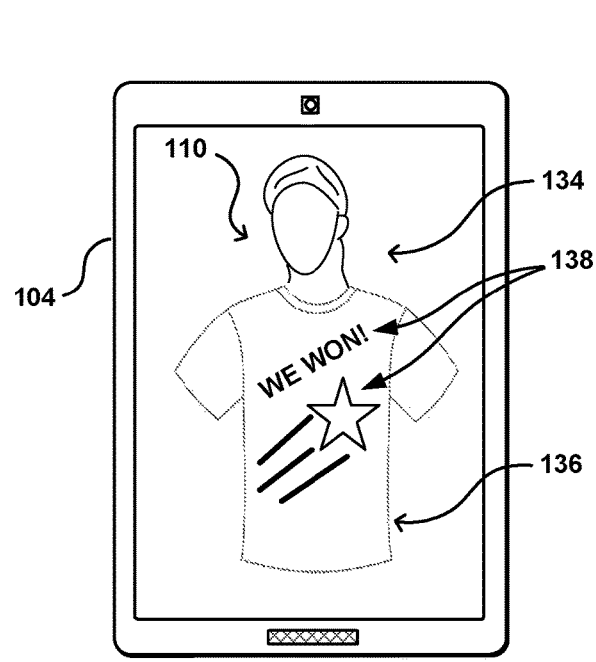

FIGS. 1A and 1B illustrate example situations 100, 130 where a user 102 can view augmented reality fashion, in accordance with various embodiments. In the example of FIG. 1A, a person 110 is wearing an article of clothing 112 (in this example, a shirt, although in various embodiments any type, cut, fit, or style of clothing may be used). The shirt 112 in the example of FIG. 1A has several markings. A contour marking 114 appears on the shirt 112, for example to define a shape or periphery of the shirt 112. According to various embodiments, contour marking 114 may be used as part of an approach to determine a boundary of an article of clothing represented in image data, such that a replacement area in the image data may be determined. If other image data (e.g., substitute image data or modified image data, as described herein) is designated or otherwise selected to appear on the image of the article of clothing, then the other image data may fill the entire replacement area so that it appears as if the boundary defined by the contour marking on the article of clothing has been filled (e.g., replaced, overlaid, etc.) with the other image data, including covering the contour markings. As described herein, there may be multiple contour markings 114 defining an outline of the shirt 112 as viewed from various angles, and contour marking 114 may take up more or less of the shirt 112 as illustrated in the examples of FIGS. 1A-1B. Additionally, shirt 112 may comprise a "call to action" element, such as text, a logo, code, etc., that instructs a viewer in the "real world" to view the wearer through a device that provides the augmented reality fashion experience.

In an embodiment, a contour marking defines a shape, for example by determining various points along the contour marking and matching those points to actual or virtual points defining an article of clothing, for example. The contour marking may be considered as a continuous shape descriptor or as a discrete number of points along a periphery of an article of clothing, which when matched or otherwise compared to points along a periphery of prospective article of clothing, may allow the outer boundary or inner area to be reliably determined.

In the example of FIG. 1A, contour marking 114 is visible on the article of clothing 112, in the example being a dark or black coloring defining all or part of the outline of the article of clothing 112. For example, a dress implementation of the article of clothing may have a contour marking representing an outline of the dress around areas of the dress that represent the boundary around the periphery of the dress. The contour marking 114 may be dependent on the view of the article of clothing 112. For example, a contour marking for a shirt viewed from the side will be in a different location on the shirt than a contour marking meant to be viewed head-on, as in from the front. In some embodiments, there may be multiple contour lines for different views. For example, one contour line may represent the outline of an article of clothing when viewed from the front (or back), while another contour line on the article of clothing may be intended to represent the outline when viewed from the side. In some embodiments with multiple contour lines, each contour line representing an outline from a different view perspective may be differentiated in some way; for example, with different colors or patterns, such that automated image analysis or interactive selection may discern which contour line to use in a given situation. Contour lines may also be printed on the article of clothing in different type of ink or other substance. For example, a contour line may be created using dye, ink, or other substance that appears invisible to the naked eye, but appears when viewed in an image, for example when using special image processing, or a special camera setting, for example to detect UV ink or dye. This technique may also be used to differentiate between multiple contour lines.

In some embodiments, data representing locations on an article of clothing where a contour marking would be, or had been, may be stored and represented in some way. For example, if data representing a contour marking were associated with a reference marker or some other marking, as discussed further herein, then the data could be accessed and a boundary determined, such that a replacement area could be determined and other image data accurately placed onto the shirt represented in the image data.

The shirt 112 in the example of FIG. 1A also has a reference marker 116 displayed on the front of the shirt 112, although the location and number of the reference marker(s) 116 may vary according to the embodiment. While the reference marker 116 of FIG. 1A is represented as a QR code, other examples of reference markers 116 may be used; for example, fiducials, text, wireless signals such as those emitted by a beacon or other type of transmitter, either worn on, in, or woven into the shirt 112, etc. Any type of marking may be used, for example one that may be recognized and/or translated into data by a computer, and the reference marker(s) 116 may comprise a unique identifier, either individually or as a collection. In an embodiment, a reference marker may comprise an article of clothing; for example, a wearer may have a shirt with a car on the front. By taking a picture of the shirt and providing that image to a system that performs the recognition of the reference markers, as described further herein, once that shirt is recognized, for example by a viewer acquiring original image data through a camera on his cellphone, then the shirt itself operates as a reference marker (e.g., an identifier). This may also be the case with a sub-portion of the shirt; for example, the entire shirt with the car may have to be "recognized" in order to operate as a reference marker, or simply a portion of the shirt, such as the car. A user may be provided an interface on a device, such as the device used to take the picture, where the user can select the portion of the shirt to use as the reference marker. For example, the user may take a picture of the shirt with the car, and select the car, for example by using an interface element to draw a selection marker around the car. The reference marker 116 may be used in various embodiments to access data about the article of clothing 112; for example, dimension data (e.g., size, inseam, neck circumference, etc.) about the article of clothing 112 and data describing the type of article of clothing 112 (e.g., shirt, dress, leggings, etc.). According to various embodiments, reference marker 116 may provide data about a particular user, for example to which the shirt 112 is linked, for example to reference a particular user account of a user 110 who is wearing a shirt 112 with a reference marker 116 associated with the user's 110 account.

In the example of FIG. 1A, a viewer 102 is capturing image data of person 110 who is wearing the article of clothing 112 containing the reference marker 116 and contour marking 114. Viewer 102 is using a portable computing device 104 with a camera device 106 to capture image data contained in the capture angle 108 of the camera 106. For example, viewer 102 may be taking a picture or video data of person 110, or simply be viewing image data of person 110 on the screen of the device 104 as it is captured in real-time by the camera 106.

In the example of FIG. 1B, image data 134 being displayed on the screen of the computing device 104 of viewer 102 is illustrated. As will be discussed further herein, the shirt 112 being worn by person 110 and represented in the image data 134 has been augmented, such that the image data 134 displayed on the screen shows a different shirt 136 being worn by person 110, including substitute image data 138 that is overlaid on the image data 134 and positioned such that the original shirt 112 appeared to be replaced, including the reference marker 116 and contour marking 114. In this example, the reference marker 116 is translated to data that identifies person 110, for example person's account at a website where person 110 has selected substitute image data 138 to be displayed (e.g., overlaid, etc.) onto image data being displayed of person 110. The substitute image data 138 may comprise text, images, patterns, colors, etc., so while the person 110 walking around in the real world is wearing a shirt 112 with a reference marker 116 and contour markings 114, once image data is captured of person 110 and the reference marker 116 is identified, the substitute data 138 associated with the reference marker 116 may be retrieved and superimposed on a display of the image data 134, using the reference marker and/or the contour marking 114 to position the modified image data 138 in the image data 134.

Additionally, in various embodiments, the identity of the viewer 102 may be determined, such that a particular portion of substitute image data 138 may be linked to the viewer 102, such that the identity of the viewer 102 is transmitted to a server along with the reference marker 116, and the particular portion of substitute image data 138 linked to the viewer 102 is displayed. In the example of FIG. 1B, person 110 may know viewer 102 to also be a fan of a certain team that just won a game. Therefore, person 110 specified that, if viewer 102 (or a device linked to viewer 102) attempts to acquire augmented image data associated with person's 110 reference marker 116, then the substitute image data 138 will be a message that "we won," referring to the team of which they are both fans. Various embodiments in which other criteria are utilized to determine substitute image data While the examples of FIGS. 1A-1B are illustrated in black and white, any color, shade, tint, or pattern may be used, such that can be discerned either visually or computationally; additionally, various types of markings may be utilized for the contour marking 114, such as those having varying thicknesses or alternating placements, as well as being a continuous marking around a periphery or outline of the article of clothing or only partially present. For example, the contour marking 114 could be a dashed marking, or be present at certain places around the article of clothing, for example at particular points (e.g., dots at the bottom corners, sleeve bottoms, mid-neckline, etc.) which could be sufficient to ascertain the outline or shape of the article of clothing.

Figure 2:
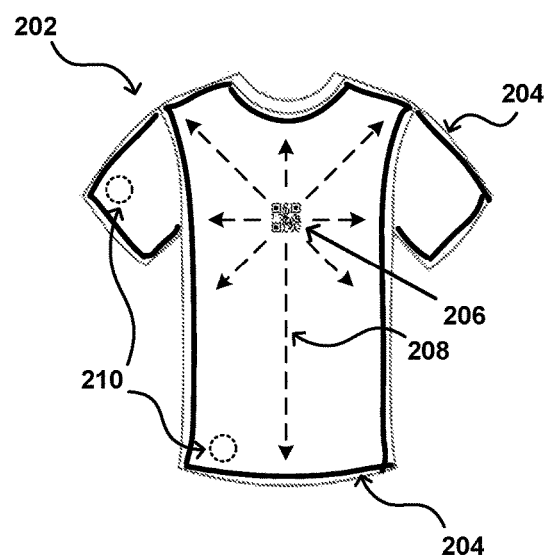
FIG. 2 illustrates an example approach for finding a replacement area on an article of clothing, in accordance with various embodiments.

FIG. 2 illustrates an example approach 200 for finding a replacement area on an article of clothing, in accordance with various embodiments. In the example 200 of FIG. 2, an article of clothing 202 (a shirt) is illustrated along with examples of a reference marker 206 and contour marking 204 that in the example of FIG. 2 are printed on the shirt 202, although as discussed herein, various embodiments in which reference marker 206 and contour marking 204 comprise different forms are envisioned. According to various embodiments, reference marker 206 is used along with contour marking 204 in order to determine how to position substitute image data in order to make substitute image data appear as if it is being "worn" in augmented reality by the person wearing the shirt 202. In one example, a process for locating contour marking 204 of shirt 202 would begin by locating reference marker 206 and proceed outward 208 until contour marking 204 has been located. In another example, if a person chooses a plaid pattern as substitute image data, then an embodiment would locate reference marker 206 and use it as a starting point to overlay the pattern outward 208 until a boundary in the image data corresponding at least in part to the contour marking 204 is reached, or in some embodiments, until the contour marking 204 is reached in the image data.

According to an embodiment, a reference marker 206 may not necessarily comprise a visible marking on a shirt 202, as illustrated in FIG. 2. One or more sensors 210 could be utilized, for example to broadcast a signal containing data that identifies a particular person, account, etc. One or more sensors 210 may be worn on the shirt 202, be woven into the shirt 202, or otherwise be associated with the shirt 202. In some embodiments, sensors 210 may be used to determine stress on the shirt 202, such that areas of the shirt 202 that are stretched or wrinkled due to not being stretched may be identified and utilized to assist in placement/positioning of substitute image data.

In addition to potentially acting as a data source as described herein, reference marker 206 may be used as an "anchor" or reference point, which when combined with the contour marking 204, provides a more accurate approach to analyzing a replacement area of a shirt 202. For example, a process of analyzing the shirt 202 to determine where to position substitute image data may begin by locating/recognizing a placement of reference marker 206, and then proceeding to ingesting/recognizing/analyzing the image data representing the shirt 202 until reaching the contour marking 204, thereby giving an indication that the shirt has been completely and accurately ingested into the analyzing process.

According to an embodiment, reference marker 206 may provide sizing or other dimension data associated with the shirt 202, as well as data regarding any characteristic of the shirt 202 such as cut, fit, fabric, etc., which may be utilized to in the process for analyzing and determining where to position substitute image data, as described earlier. A location of the reference marker 206 may also be relative to contour markings 204 for different sizes of shirts 202.

In an embodiment, reference marker 206 may also provide data indicating a type of shirt, as well as cut, fit, etc. of a shirt that should be used in the augmented reality. For example, a reference marker may indicate that the shirt being worn in real-life is a long-sleeve shirt; therefore, the substitute image data should be positioned with that in mind, as well as patterns, colors, etc. taking the long sleeves into account. If the reference code indicates a short-sleeve shirt where the sleeves end at the mid-bicep, but the substitute image data used is that of a long-sleeve shirt, then the view of the wearer in the augmented reality will be "off" regarding the person's arms below mid-bicep.

Figure 3:
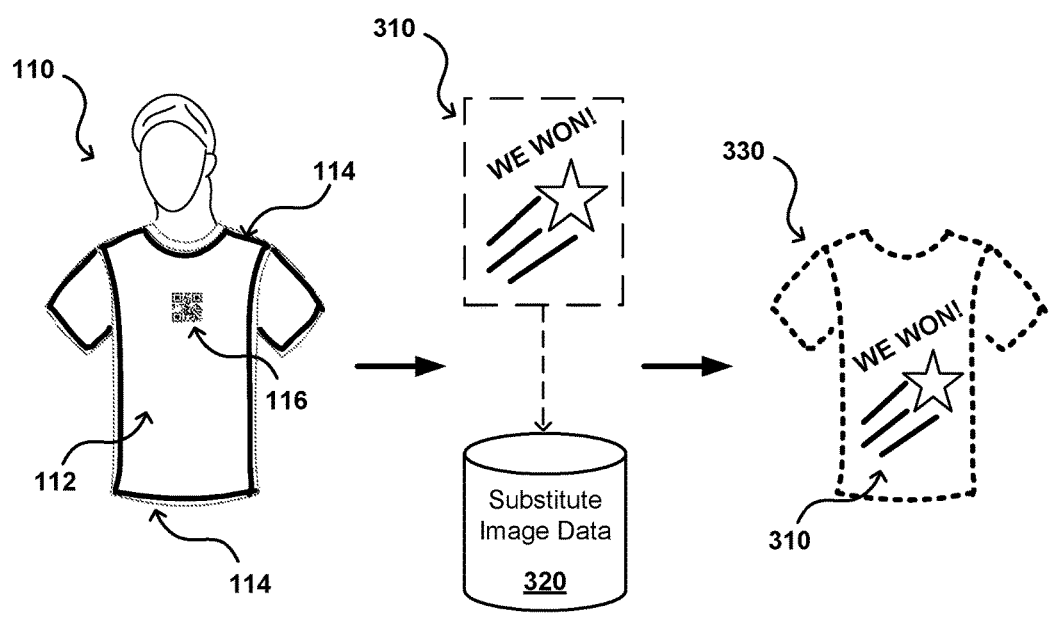
FIG. 3 illustrates an example approach for substituting image data on an article of clothing in an augmented reality, in accordance with various embodiments.

FIG. 3 illustrates an example approach 300 for substituting image data on an article of clothing in an augmented reality, in accordance with various embodiments. It should be understood that reference numbers may be carried over between figures for similar components for purposes of explanation, but that such use should not be interpreted as a limitation on the various embodiments. In the example 300 of FIG. 3, person 110 is wearing shirt 112 that has a reference marker 116 and contour marking 114. Image data of person 110 is captured, and the reference marker 116 is analyzed, such that it serves as a unique identifier for person 110. A query may be made, either on a device or remotely, for example to a server or cloud computing environment, such as discussed later with reference to FIG. 10, and substitute image data 320 is accessed. For example, substitute image data 320 may comprise a data repository of numerous potential portions/instances of substitute image data 320, all or some of which may be associated with person 110 through reference marker 116 (e.g., an account associated with person 110 through reference marker 116, etc.), although in various embodiments, persons other than a wearer of a shirt about to be "augmented" may be associated with substitute image data 320. In this example, a particular piece of substitute image data 310 is identified in the substitute image data repository 320, such as using techniques discussed further herein. Substitute image data 310 is then transmitted to the device on which the image data corresponding to the person 110 wearing the shirt 112 is being viewed (e.g., from a data store on the device or from a remote location over a network to a device, etc.), and is used to generate an augmented reality version of the shirt 330 (e.g., modified image data, etc.) that displays the substitute image data 332 as an overlay (or replacement, merge, etc.) for the original image data captured by the device.

Figure 4A:
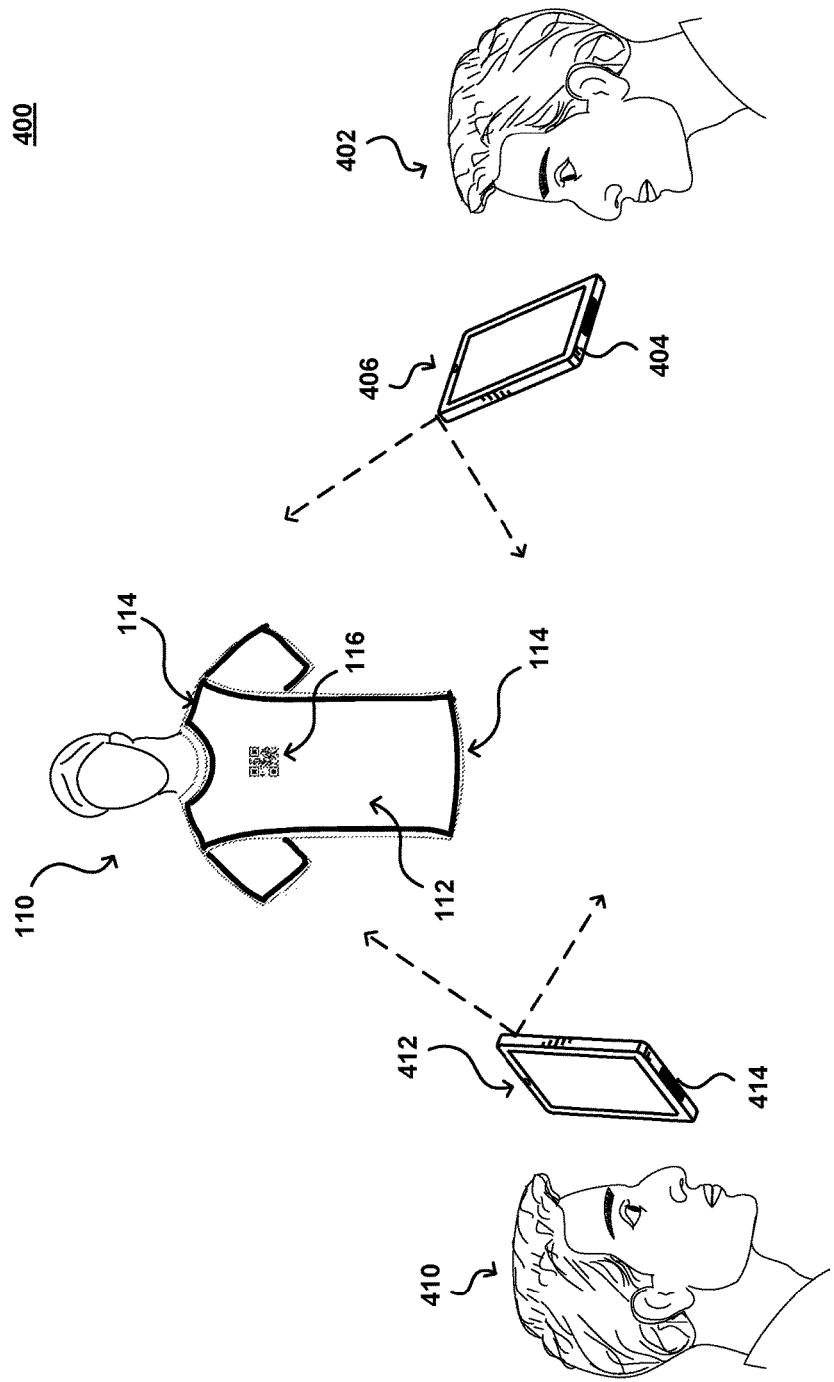
FIGS. 4A-4B illustrate an example situation for presenting different augmented reality articles of clothing to different users, in accordance with various embodiments.
Figure 4B:
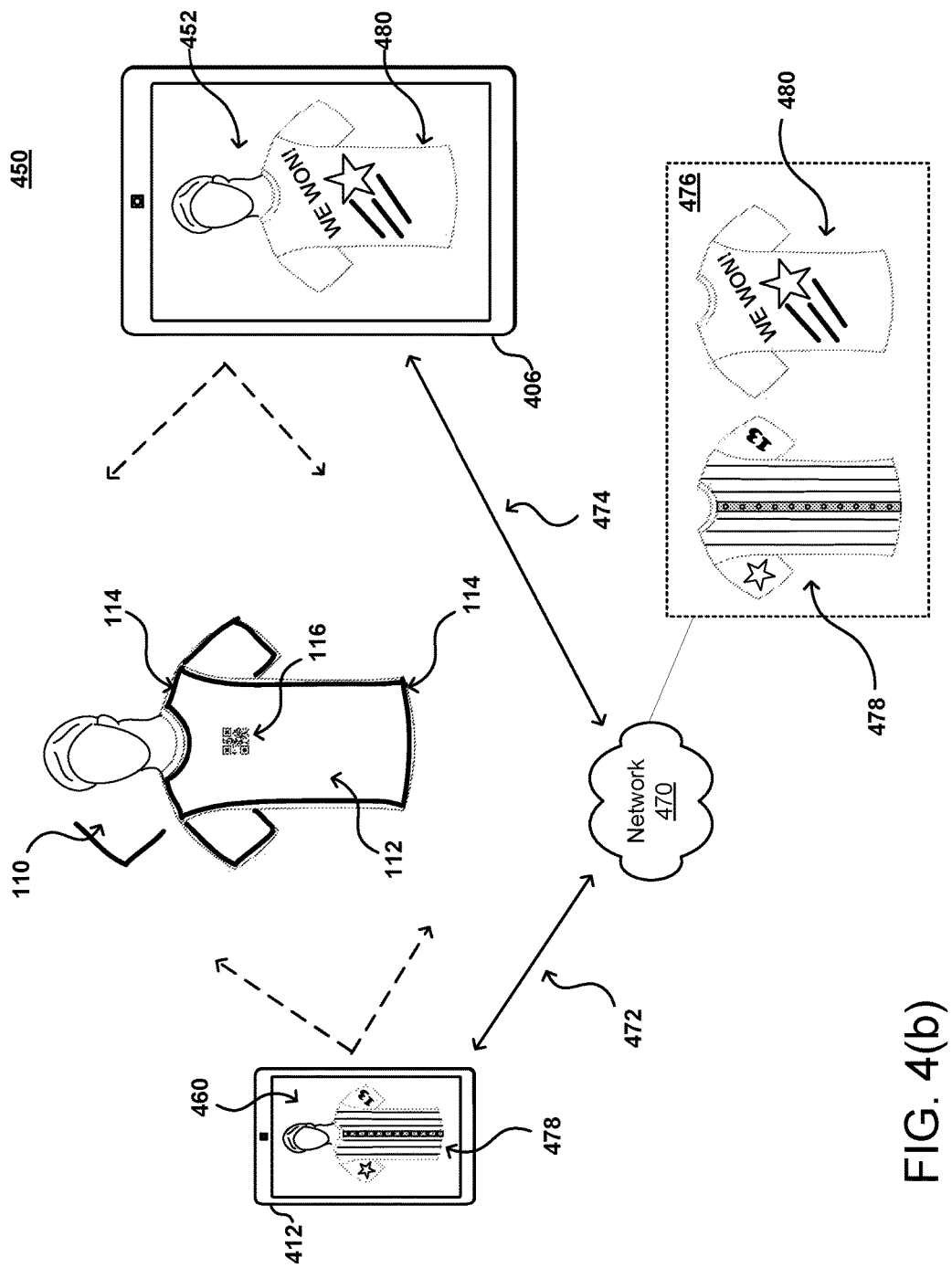

FIGS. 4A-4B illustrate an example situation 400, 450 for presenting different augmented reality articles of clothing to different users, in accordance with various embodiments. In the example 400 of FIG. 4A, person 110 is wearing shirt 112 with a reference marker 116 and contour marking 114. Two different viewers 402, 410 are capturing image data (e.g., still images and/or video data) of person 110 with cameras 406, 412 of their devices 404, 414, which in the example of FIG. 4A are mobile computing devices such as smartphones and/or tablets, but in various embodiments could comprise other types of computing devices, as discussed further herein. In the example of FIGS. 4A-4B, identities associated with the viewers 402, 410 are determined, such as usernames, social graph identifiers, account information, etc. By determining an identity associated with a viewer of image data that is to be augmented according to the techniques described herein, different substitute image data may be selected to be displayed to different viewers, for example based at least in part on the viewer's identity.

In the example 450 of FIG. 4B, the identities of the viewers has been determined and different substitute data is being delivered to the devices 406, 412 to augment the original image data. On the device 406 of the first viewer 402 (not pictured), the reference marker 116 is identified in the original image data, and a query is transmitted 474 over a network 470, for example to a substitute image data store 476 that contains two portions of substitute image data 478, 480. Based on an identity associated with the first device 406, a first portion of modified image data 480 is selected and transmitted back 474 to the device 406, so that it can be displayed 452 such that the particular portion of substitute data 476 augments the original image data so it appears on the display of the device as if the person 110 is wearing the shirt that comprises the particular portion of substitute data 476.

Likewise, second viewer 410 (not pictured) is capturing image data of person 110 on his device 412, and based on the reference marker 116 and an identity associated with the device 412 (or with the viewer, etc.), a query is sent to substitute image data store 476 and the other portion of substitute image data 478 is selected and sent back to the device 412 for display 460. In this example, two devices 406, 412, each capturing image data of the same person 110, the same shirt 112, and the same reference marker 116 end up displaying different augmented reality fashion 452, 460.

According to various embodiments, any number or type of constraints and/or criteria may be utilized in a determination of which substitute image data is to be selected and sent to a device for display (although in some embodiments, all of the capturing, processing, and selection of data is performed on a device). For example, if a person points their cellphone camera (or views them through a VR wearable device, etc.) at a particular person wearing a shirt in accordance with the approaches described herein, then the person wearing the shirt can have control over what that person sees in the augmented reality fashion displayed on their device, for example if an identity of the viewer can be established. For example, a person can specify that all people viewing him today that send a query associated with the person's reference code (e.g., that is displayed on the shirt being worn by the person) before 4 PM will see a blue striped dress shirt, and after 4 PM, the viewers will see the person wearing a Hawaiian shirt. The person could also choose different people or groups of people to receive different substitute image data, as described earlier. A constraint could also include relationship data, for example on a social network or social graph. For example, a person may designate all people that he has labeled "friends" will see a t-shirt with a logo of his favorite band, while people he has labeled "business" will see a more conservative shirt. The control may be as granular as desired. For example, a person could have a private joke with one of their friends, and designate it such that when that friend is viewing them in augmented reality, that the joke be displayed to them, but only to them.

Figure 5:
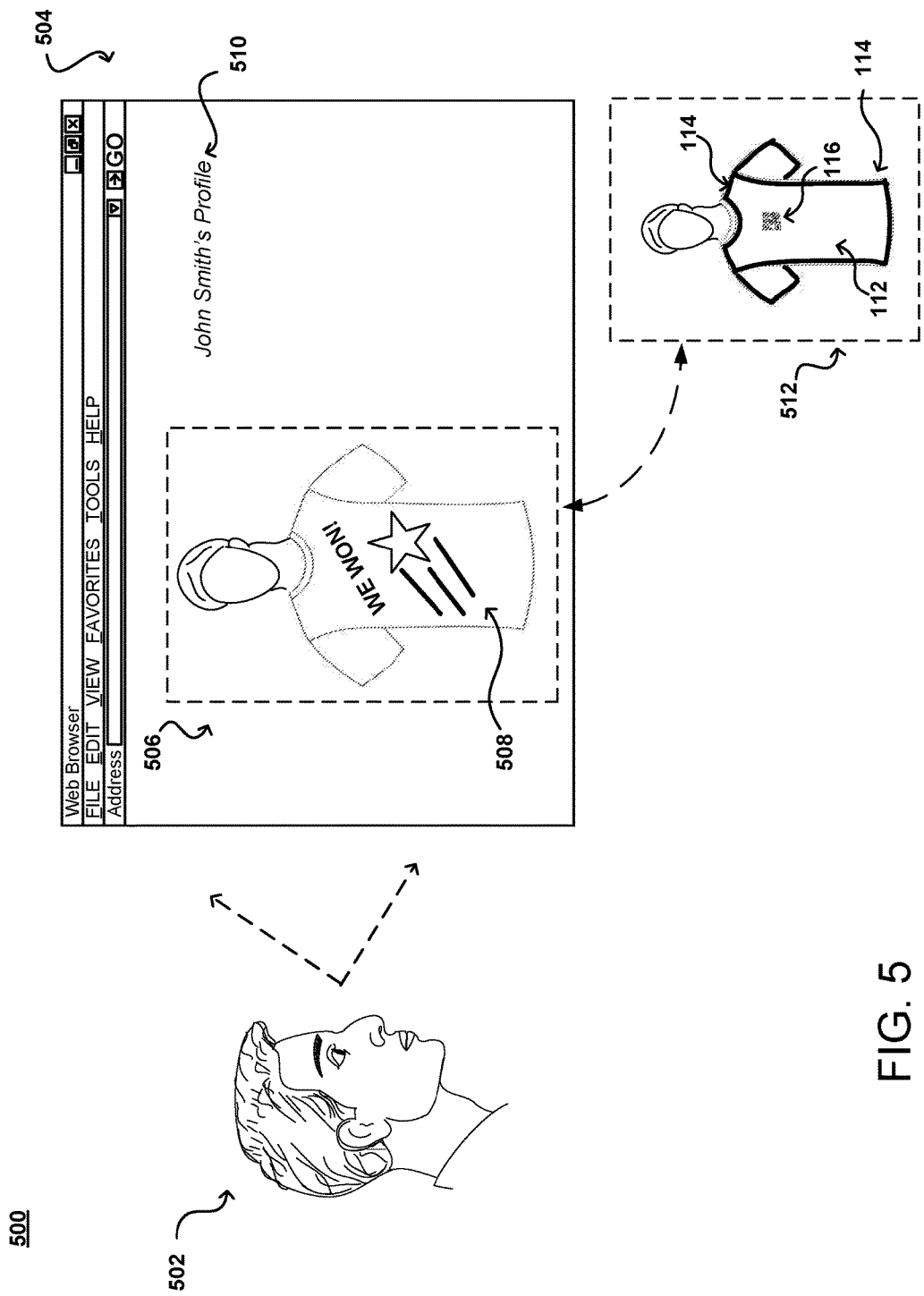
FIG. 5 illustrates an example situation where a user can view augmented reality fashion, in accordance with various embodiments.

FIG. 5 illustrates an example situation 500 where a user can view augmented reality fashion, in accordance with various embodiments. In the example 500 of FIG. 5, a viewer 502 is looking at a web page 504, for example a person's profile 510 on a social network web site. The profile owner may have posted a picture of himself 512 wearing an article of clothing 112 as described herein, with a reference marker 116 and contour marking 114. The device on which the web browser 504 is executing can recognize the reference marker 116 in the image data 512, and using the techniques described herein, cause a substitute portion of data 508 to be selected and displayed 506 along with the original image data 512, such that the augmented reality image 506 makes it appear to the viewer 502 as if the person is wearing the substitute image data instead of the shirt 112. According to another embodiment, viewer 502 will see the augmented reality image 506 when he looks at the web page 504 through a device that captures image data, as described herein. In an embodiment, an additional program, such as a browser plug-in, may be utilized to provide the present functionality on any website, while some websites may be able to provide native support for the present techniques; for example, depending on where the original image data, substitute image data, and/or device are stored, executing, and/or connected.

Figure 6:
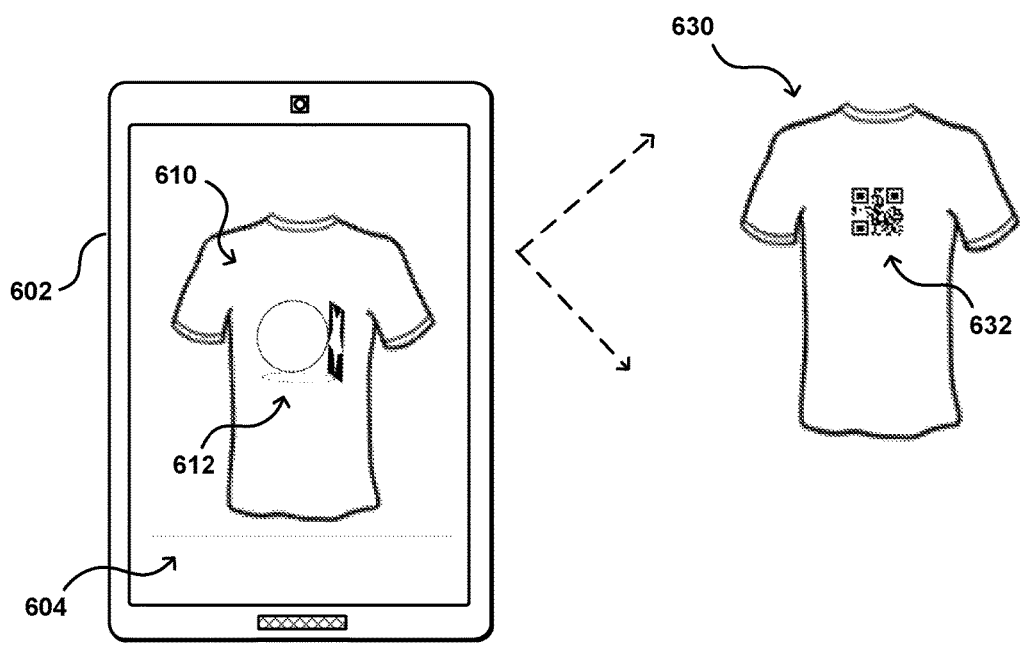
FIG. 6 illustrates front and side views of an example situation where a user can view augmented reality fashion, in accordance with various embodiments.
Figure 6:
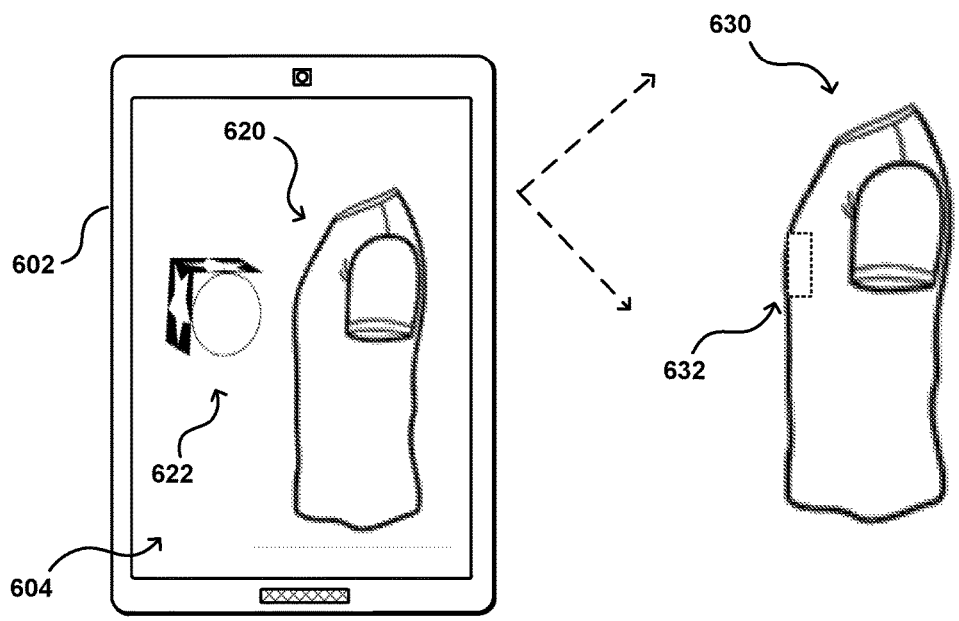

FIG. 6 illustrates front 600 and side 650 views of an example situation where a user can view augmented reality fashion, in accordance with various embodiments. In FIG. 6, a person is wearing a shirt 630 including a reference marker 632. In the front view 600, image data is being captured by a device 602 such that the device is straight-on to the front of the shirt 630, where the reference marker 632 is positioned. As a result, the image data of the shirt 610 displayed on a screen 604 of the device is a straight-ahead view. In the example of FIG. 6, the substitute image data comprises a 3-D object 612, 622 that has multiple view perspectives. In the front view 600, one perspective view of the 3-D object is displayed 612 as if it were floating in front of the augmented shirt 610. In the side view 650, the camera of the device 602 is capturing the shirt 630 from a side view, such that the perspective of the reference marker in the image data is representative of the camera view perspective when compared to the front view 600. By identifying the view perspective based at least on the recognized angle of the reference marker 632, then the appropriate view of the 3-D object may be selected as the substitute image data. In the side view example 650, this results in a different view of the 3-D object 622 being displayed floating in front of a side view of the augmented shirt 620. In alternate embodiments, different reference markers, as well as one or more contour markings, could be utilized to indicate different angles and/or perspectives of view, such that an identification of a particular reference marker could indicate which perspective of the 3-D substitute data to select and display.

According to various embodiments, a person could capture image data in a 360 degree field around a person wearing an article of clothing in accordance with the techniques described herein, and the view of a 3-D substitute image data would be selected based on the corresponding view of the device capturing the image data, for example based on a determination of a position/angle/skew/tilt/etc. of one or more reference markers, contour markings, wireless sensors, etc., as well as a distance from the marker, which could be used for example to determine how large to make the 3-D substitute image data and how far in front of (for example) the shirt the 3-D substitute data should "float." For example, if a person designates a 3-D image of a sports car to be displayed in an augmented reality view of his shirt, then a viewer viewing the shirt head-on through their device would see, depending on various criteria designated by the person, a head-on view of the sports car. As the viewer changes their perspective, for example by circling around one side on the person, who remains stationary, then the changed perspective would be determined and the substitute image data changed accordingly, such that the 3-D substitute image data would have a perspective corresponding to the perspective of the viewer. In some embodiments, the 3-D substitute image data may be made to appear to move around the person wearing the shirt; for example, using various reference markers, contour markings, and/or other perspective data, etc. For example, the sports car of the above example may be made to "drive" around the person in augmented reality. Other types of animation and/or sounds, etc. may provided.

Figure 7:
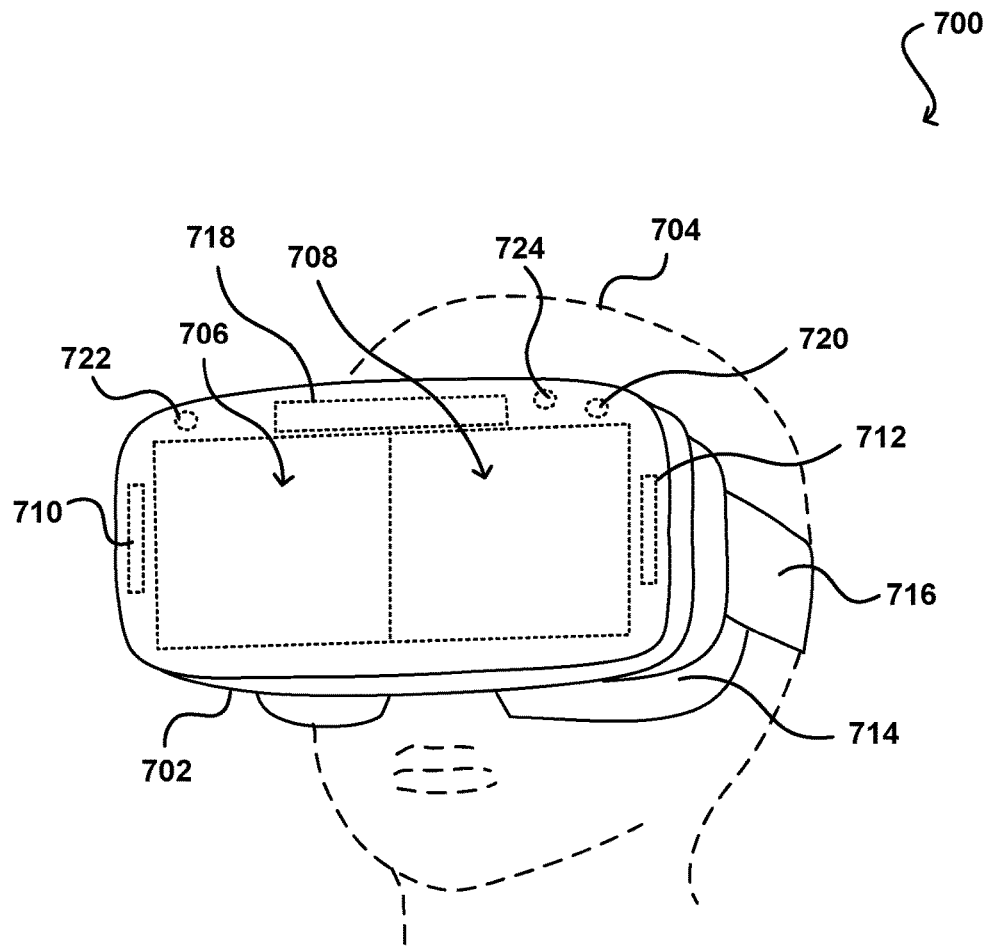
FIG. 7 illustrates an example virtual reality device that can be utilized, in accordance with various embodiments.

FIG. 7 illustrates an example augmented reality device 700 that can be utilized in accordance with various embodiments. Various other types of devices, such as smart glasses, goggles, and other augmented and/or virtual reality displays and devices can be used as well within the scope of the various embodiments. According to various embodiments, augmented reality and virtual reality may provide different experiences. For example, virtual reality may replicate an environment that simulates a presence in a virtual world, while augmented reality viewing devices are wearable (or portable) devices that add information to what the viewer sees in the real world, for example with transparent or heads-up displays or other displays and/or overlays that allow for the projection of digital images and other data into a person's view of the real world. The augmented reality device 700 may take a form of a traditional virtual reality headset or an augmented reality device, and the example device 700 is not limited to one or the other. In this example, the device includes a housing 702 made of a material such as plastic with a polymer lip 714 or other such portion intended to contact the user's face in order to provide for comfort of the user as well as providing a relatively light-tight seal to prevent extraneous light from passing to the user's eyes while wearing the device. The example device also includes a strap 716 or other such mechanism for securing the device to the user's head, particularly while the user's head 704 is in motion. The example device includes a left eye display screen 708 and a right eye display screen, although as mentioned in some embodiments these can be portions of a single display screen or arrays of multiple screens, or holographic displays, among other such options. In some embodiments a single display element will be used with respective convex lenses for each eye and one or more separation elements that limit the field of view of each eye to a designated portion of the display. The device will typically include display circuitry 718, as may include memory, one or more processors and/or graphics processors, display drivers, and other such components known or used for generating a display of content. There can be a single set of circuitry for both displays 706, 708 or at least some of the components can be duplicated for each display such that those components only provide for display of content on one screen or the other. The display screens can be any appropriate type of display, such as an AMOLED or LED display with sufficient refresh rate for augmented and/or virtual reality applications. The device includes one or more motion and/or orientation sensors 710, as may include at least one accelerometer, magnetometer, gyroscope, electronic compass, inertial sensor, and/or other such sensor for providing data about rotation, translation, and/or other movement of the device. The motion and/or orientation data can be used to determine the appropriate point of view (POV) from which to render the current scene of content. The example device also includes at least one communication component 712, such as a wired or wireless component for transmitting data over a protocol such as Bluetooth, Wi-Fi, 4G, and the like. The communication component can enable the device 700 to communicate with a computing device for purposes such as obtaining content for rendering, obtaining additional input, and the like. The example device can include other components as well, such as battery or power components, speakers or headsets, microphones, etc.

The example device 700 can also include one or more cameras 720, 722 or other image capture devices for capturing image data, including data for light reflected in the ambient or infrared spectrums, for example, which in various embodiments may be used to "see" the real world on which augmented reality may be superimposed, as well as discern features on an article of clothing that may otherwise be invisible to the naked human eye (e.g., ink used to print a contour marking on an article of clothing, the ink only being visible in the ultraviolet spectrum, etc.). One or more cameras can be included on an exterior of the device to help with motion tracking and determining environmental conditions. For example, locations of light sources, intensity of surrounding ambient light, objects or persons nearby, or any of various other objects or conditions can be determined that can be incorporated into the augmented and/or virtual reality scene, such as to make the lighting environmentally appropriate or to include things located around the user, among other such options. As mentioned, tracking the motion of objects represented in the captured image data can help with motion tracking as well, as rotation and translation data of surrounding objects can give an indication of the movement of the device itself.

Further, the inclusion of one or more cameras 720, 722 on the inside of the device can help to determine information such as the expression or gaze direction of the user. In this example, the device can include at least one IR emitter 724, such as an IR LED, that is capable of emitting IR radiation inside the device that can be reflected by the user. IR can be selected because it is not visible to the user, and thus will not be a distraction, and also does not pose any health risks to the user. The IR emitter 724 can emit radiation that can be reflected by the user's face and detected by one or more IR detectors or other image capture elements 720, 722. In some embodiments the captured image data can be analyzed to determine the expression of the user, as may be determinable by variations in the relative locations of facial features of the user represented in the captured image data. In some embodiments, the location of the user's pupils can be determined (as discussed elsewhere herein), which can enable a determination of the gaze direction of the user. The gaze direction of the user can, in some embodiments, affect how objects near to, or away from, the center of the user's field of view are rendered.

Figure 8:
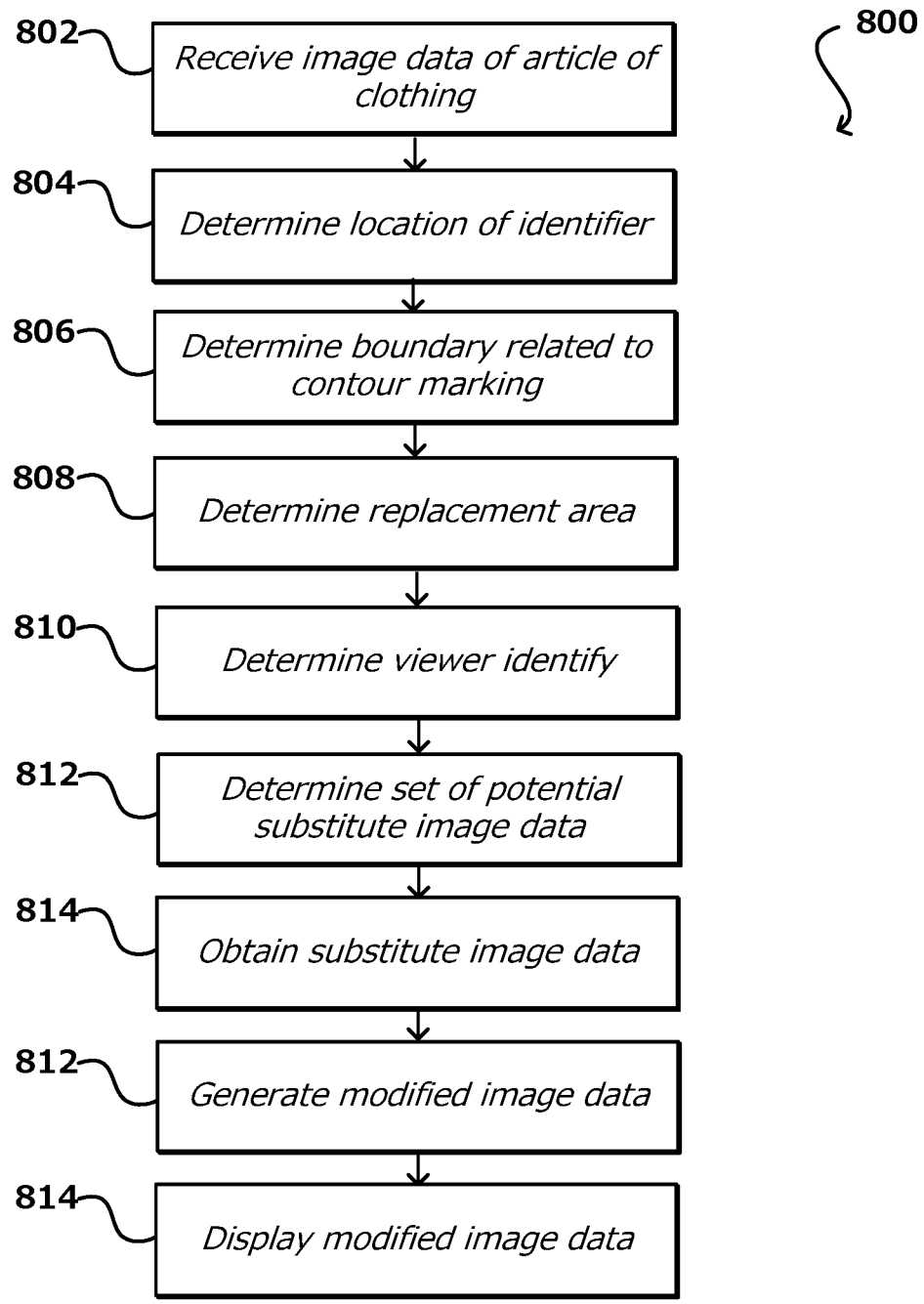
FIG. 8 illustrates an example process for augmented reality fashion, in accordance with various embodiments.

FIG. 8 illustrates an illustrates an example process 800 for augmented reality fashion, in accordance with various embodiments. It should be understood that, for this and other processes discussed herein, there can be additional, fewer, or alternative steps, performed in similar or alternative steps, or in parallel, within the scope of the various embodiments unless otherwise stated. In FIG. 8, image data of an article of clothing is received 802, for example by a camera of a computing device that is capturing the image data of a person wearing the article of clothing in real-time. An identifier, such as a reference marker, is identified 804 in the image data. A contour marking of the clothing is identified and used to determine a boundary 806 of the article of clothing. In various embodiments, the contour marking serves as the boundary. A replacement area in the image data is determined 808, the replacement area being determined by analyzing a relation of the identifier to the boundary of the clothing. For example, by starting at the identifier and working outward to the boundary identified in the image data, the replacement area may be defined.

A viewer identity is determined 810, for example by analyzing data associated with the device being used to capture the image data and that is transmitted along with data associated with the identifier. A set of potential substitute image data is obtained that corresponds to the identifier 812, and one or more portions of substitute image data are selected and obtained 814 from the set of potential substitute image data, for example based on the viewer identity. Modified image data is generated 812, which according to an embodiment comprises a placement of the substitute image data on the original image data (i.e., the image data captured of the person wearing the clothing), and the placement of the substitute image data corresponds to the replacement area. The modified image data is displayed 814, for example in real-time on the viewer's device. In various embodiments, the substitute image data 812 may be displayed in locations or positions other than to appear "on" the clothing; for example, one piece of substitute image data may comprises a pumpkin that appears on a person's head, while another piece of substitute image data may comprises a Halloween-themed shirt or text or video, etc., and the modified image data will reflect each. Any number of pieces/portions of substitute image data may be used in the creation of modified image data 812.

Figure 9:
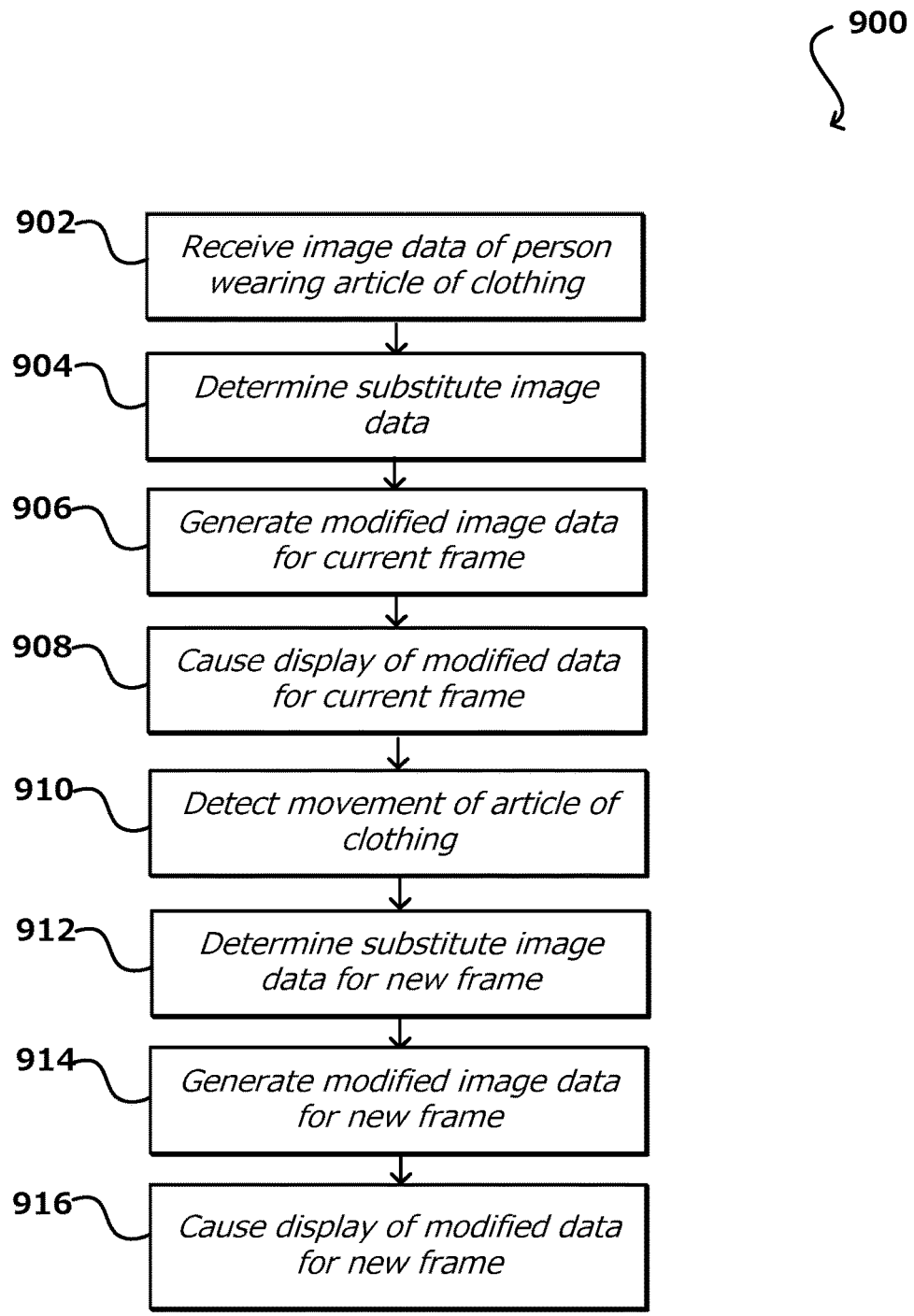
FIG. 9 illustrates an example process for augmented reality fashion, in accordance with various embodiments.

FIG. 9 illustrates an example process 900 for augmented reality fashion, in accordance with various embodiments. In the example of FIG. 9, image data of a person wearing an article of clothing, such as a shirt, is received 902, for example by a camera of a viewer's computing device. The image data may comprise multiple frames of image data, for example a recorded video or real-time image data streaming from the camera of the device. Substitute image data is determined 904, for example based on a reference marker associated with the clothing. Modified image data for a frame of the image data is determined 906, and is displayed along with the current frame 908 of image data being displayed on the device, according to the techniques described herein.

A detection of movement is made 910, for example by comparing a position of the reference marker and/or the contour marking in one frame of image data to a subsequent frame. In response to detecting movement of the clothing in the image data, new substitute image data is determined for the new frame of image data 912, if necessary. Based on the new substitute image data and the new position of the clothing in the image data, modified image data is generated for the new frame 914 of image data, and is caused to be displayed 916 for the new frame of image data.

Figure 10:
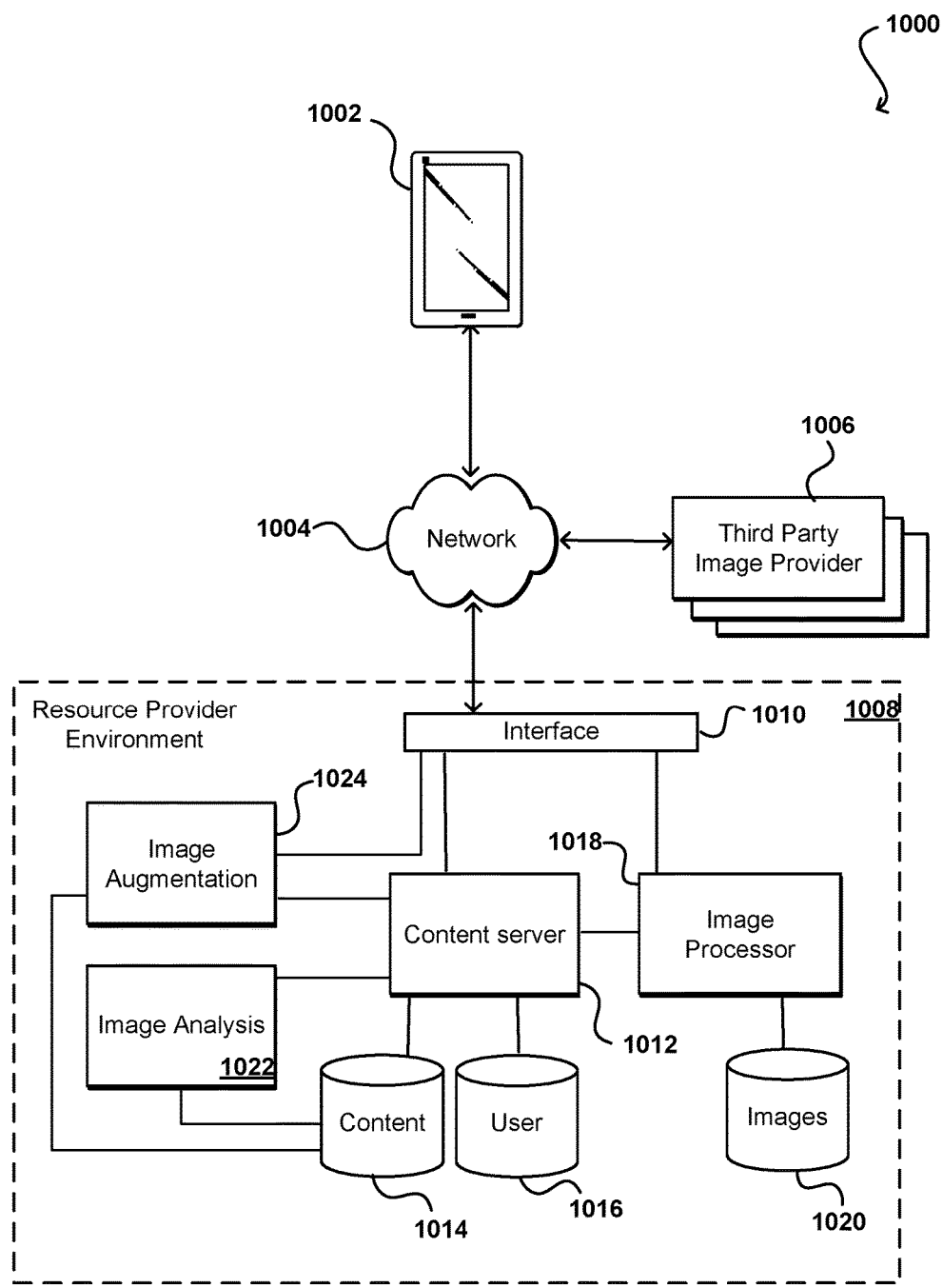
FIG. 10 illustrates an example system that can be used for augmented reality fashion, in accordance with various embodiments.

FIG. 10 illustrates an example environment 1000 that can be used to implement aspects in accordance with various embodiments. In FIG. 10, a client computing device 1002 can submit content and/or a request for content across at least one network 1004 to be received by a resource/content provider environment 1008. According to various embodiments, a client computing device 1002 may comprise a laptop or desktop computer, a set-top device, etc., as well as various types of mobile devices, such as cellphones, tablets, virtual reality headsets, and wearable devices (e.g., glasses, contact lenses, etc.). The network(s) can include any appropriate network, such as the Internet, a local area network (LAN), a cellular network, an Ethernet, or other such wired and/or wireless network. The resource provider environment 1008 can include any appropriate resources for providing content from a resource provider, as may include various servers, data stores, and other such components known or used for providing content from across a network (or from the "cloud").

In this example, a call received to the resource provider environment 1008 can be received by an interface layer 1010 of the environment. As known for network environments, the interface layer can include components such as interfaces (e.g., APIs), load balancers, request and/or data routers, and the like. If the request is a request for content, such as for content for a page to be displayed in an application (e.g., browser), information for the request can be directed to one or more content servers 1012, which can obtain the content from a content data store 1014 or other such repository to be sent back across the network(s) to the computing device. In some embodiments, information for the request might also be compared against user data in a user data store 1016 or other such location do determine, for example, an identity of the user, whether the user has access rights to that content, etc. In one example, the content can include a plurality of images to be displayed as part of a set of search results, although various other types of content and uses for images can be utilized as well within the scope of the various embodiments.

In some cases, a request received to the content provider environment 1008 might be from another entity, such as a third party image provider 1006. As discussed previously, such providers may provide images to be displayed to users along with the served content. The interface layer can determine the type of request and cause information to be forwarded to an image processor 1018 or other such component, which in some embodiments can cause the images to be stored to an image data store 1020 at least temporarily. Since it may be desirable to manipulate at least some of the images before being presented for display, as discussed herein, the image processor can process at least some of the images before causing those images to be stored in the content repository 1014, for example, to be presented for display to a user or otherwise utilized.

The content provider environment 1008 can also include an image analysis component 1022, system, or service that is able to analyze images using approaches discussed herein. These can include, for example, images received from third party suppliers, images stored in the content database 1014, or images received from a user, among other such options. These images thus can also be stored in the content database 1014, or another appropriate data store, at least for augmentation purposes. The resource provider environment 1008 also can include at least one image augmentation component 1024, system, or service, which can receive data about images from the image analysis component 1022 and attempt to receive data stored in the content database 1014, whereby the results of the augmentation can be passed to the content server 1012 for transmission to the requesting computing device 1002.

According to an embodiment, the techniques described herein may be performed solely or partially on a client computing device 1002, without utilizing the resource provider environment 1000 for some or all portions of the techniques described herein. For example, a client computing device 1002 may perform various aspects of the techniques described herein without at least some portions of data leaving the client computing device 1002, thereby ensuring privacy of data such as the image data or identity data described herein.

Once the data associated with the article of clothing, including data regarding a contour marking and/or reference marker, among other potential identifiers or markings contemplated by one of ordinary skill in the art, then a user may receive substitute image data used to provide an augmented reality display, for example on the same cellphone, or on a device under their control (e.g., a wearable device such as a VR headset), such that data used to provide the augmented reality may be shared between the devices without the need to communicate the data to a third party, for example over the Internet. All augmentations of the prospective article(s) of clothing may then be determined on the user's device, with resources only transferred from a third party (e.g., a resource provider environment) on an as-needed basis, such as product images, account information, HTML pages, etc., thereby securing the device and any private body data from unwanted transmission.

Figure 11:
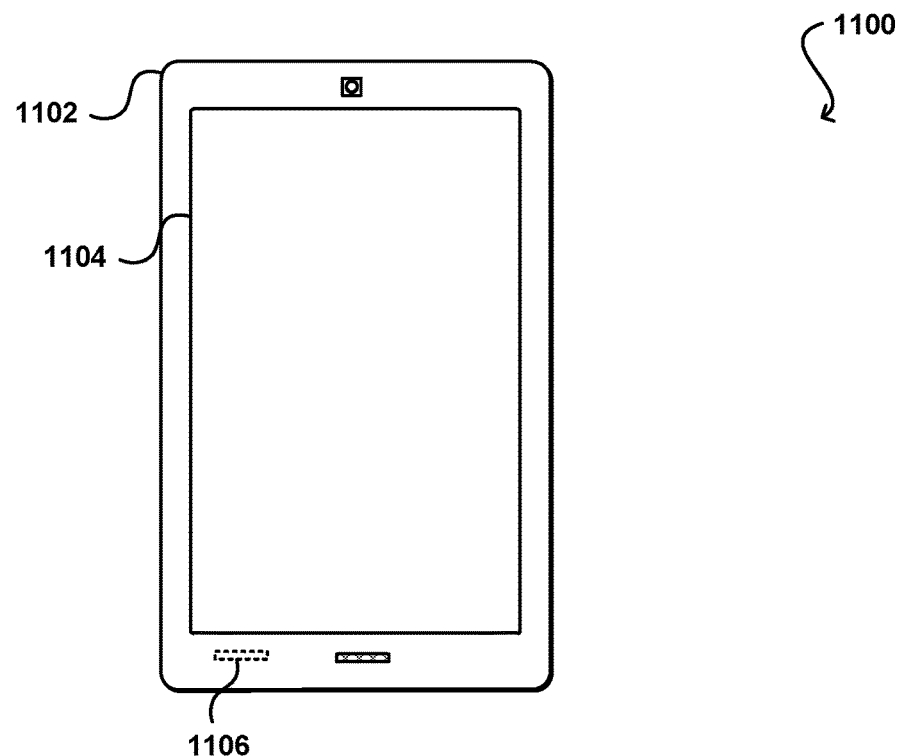
FIG. 11 illustrates an example computing device that can be utilized, in accordance with various embodiments.

FIG. 11 illustrates an example computing device 1100 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), augmented and/or virtual reality wearable devices, television set top boxes, and portable media players, among others.

Figure 12:
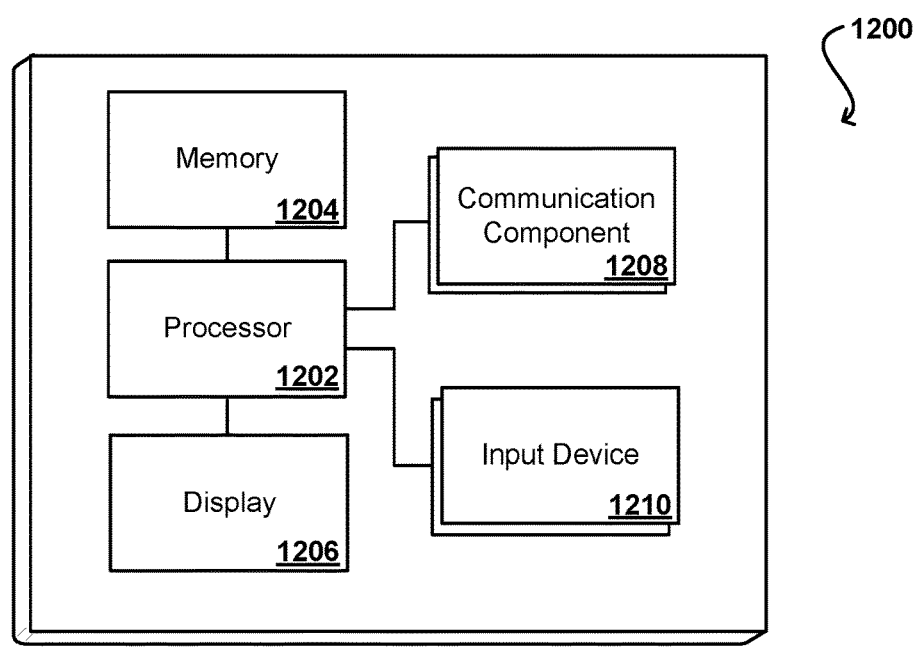
FIG. 12 illustrates an example configuration of components of a computing device, such as the device illustrated in FIG. 11.

In this example, the computing device 1100 has a display screen 1104 and an outer casing 1102. The display screen under normal operation will display information to a user (or viewer) facing the display screen (e.g., on the same side of the computing device as the display screen). As discussed herein, the device can include one or more communication components 1106, such as may include a cellular communications subsystem, Wi-Fi communications subsystem, BLUETOOTH® communication subsystem, and the like. FIG. 12 illustrates a set of basic components of a computing device 1200 such as the device 900 described with respect to FIG. 9. In this example, the device includes at least one processor 1202 for executing instructions that can be stored in a memory device or element 1204. As would be apparent to one of ordinary skill in the art, the device can include many types of memory, data storage or computer-readable media, such as a first data storage for program instructions for execution by the at least one processor 1202, the same or separate storage can be used for images or data, a removable memory can be available for sharing information with other devices, and any number of communication approaches can be available for sharing with other devices. The device typically will include at least one type of display element 1206, such as a touch screen, electronic ink (e-ink), organic light emitting diode (OLED) or liquid crystal display (LCD), although devices such as portable media players might convey information via other means, such as through audio speakers. The device can include at least one communication component 1208, as may enabled wired and/or wireless communication of voice and/or data signals, for example, over a network such as the Internet, a cellular network, a Wi-Fi network, BLUETOOTH®, and the like. The device can include at least one additional input device 1210 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 13:
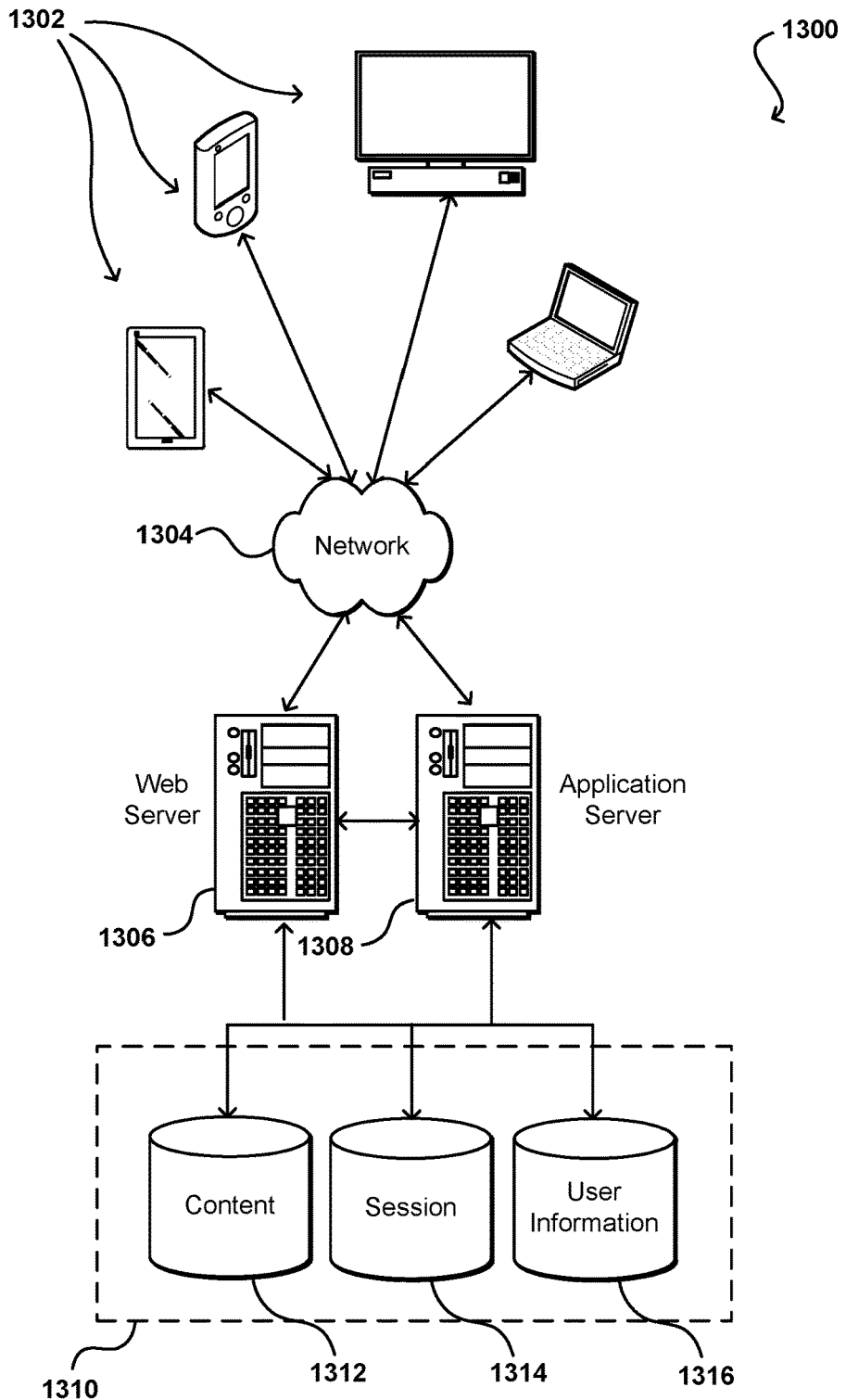
FIG. 13 illustrates an example environment in which aspects of the various embodiments can be implemented.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a camera;
   a display element;
   at least one processor; and
   memory including instructions that, when executed by the at least one processor, cause the computing device to:
      obtain original image data including a representation of an article of clothing, the article of clothing having a reference marker physically attached to the article of clothing, and represented in the original image data, and a contour marking corresponding substantially to an outline of the article of clothing;
      determine a location of the reference marker represented in the original image data;
      determine a boundary of the article of clothing represented in the original image data, the boundary corresponding substantially to the contour marking;
      determine a replacement area in the original image data, the replacement area based at least in part on the reference marker and the contour marking, the location of the reference marker being represented in the original image data in relation to the boundary of the article of clothing represented in the original image data;
      obtain substitute image data, the substitute image data being associated with the reference marker;
      generate modified image data, the modified image data comprising a placement of the substitute image data on the original image data, the placement of the substitute image data corresponding substantially to the replacement area; and
      display the modified image data on the display element, wherein the modified image data is displayed at least in substantially real time.

2. The computing device of claim 1, wherein the instructions, when executed to cause the computing device to determine a replacement area in the original image data, includes causing the computing device to:
   determine size information corresponding to dimensions of the article of clothing, the size information being associated with the reference marker;

determine an estimated location of the contour marking in the original image data, the estimated location corresponding to the size information and the location of the reference marker in the original image data; and analyze the original image data to identify the contour marking in the original image data, starting at the location of the reference marker in the original image data and proceeding outward towards the estimated location of the contour marking in the original image data.

3. The computing device of claim 1, wherein the original image data comprises a plurality of frames of video data, and wherein the instructions, when executed, further cause the computing device to:

track a movement of the representation of the article of clothing in at least two of the plurality of frames of video data, wherein the placement of the substitute image data on the original image data remains in substantial correspondence to the replacement area during the movement of the representation of the article of clothing in the at least two of the plurality of frames of video data.

4. The computing device of claim 1, wherein the instructions when executed further cause the computing device to:

determine a viewer identity based at least upon an identifier associated with the computing device;

obtain a set of potential substitute image data associated with the reference marker; and cause a selection of the substitute image data from the set of potential substitute image data based at least in part on the viewer identity.

5. A computer implemented method, comprising:

receiving original image data containing a representation of an article of clothing, the article of clothing having a data source reference marker physically proximate to the article of clothing and a contour marking corresponding to an outline of the article of clothing;

determining substitute image data based at least in part on the reference marker;

generating modified image data corresponding to a modification of the representation of the article of clothing in the original image data, the modification of the representation of the article of clothing based at least in part on the substitute image data; and causing the modified image data to be displayed with the original image data, wherein the modified image data is overlaid in the original image data, the position of the modified image data based at least on the reference marker and the contour marking.

6. The computer implemented method of claim 5, wherein determining substitute image data based at least in part on the reference marker further comprises:

receiving query data comprising data associated with the reference marker;

determining, based at least in part on the query data, a set of potential substitute image data;

causing a selection of the substitute image data from the set of potential substitute image data, the selection based at least in part on the reference marker and criteria associated with the substitute image data.

7. The computer implemented method of claim 6, further comprising:

determining an identity of a viewer of the original image data;

determining that the criteria associated with the substitute image data comprises approved identities of potential viewers; and determining that the identity of the viewer matches one of the approved identities.

8. The computer implemented method of claim 5, wherein causing the modified image data to be displayed with the original image data further comprises:

determining, in the original image, a replacement area substantially defined by the contour marking;

analyzing the substitute image data to determine a correspondence between the substitute image data and the replacement area; and causing the substitute image data to be aligned with the replacement area such that the replacement area is substantially filled with the substitute image data, wherein the contour marking is not visible.

9. The computer implemented method of claim 5, wherein the original image data comprises a plurality of frames of video, and further comprising:

determining a movement of the representation of the article of clothing, based at least in part on identifying a change in position of the contour marking between at least two frames of the plurality of frames of video;

generating, for each frame of video in which movement of the article of clothing was determined, modified image data for the frame of video, wherein the modified image data for each frame of video in which movement of the article of clothing was determined is positioned in substantial correspondence to the position of the contour marking.

10. The computer implemented method of claim 5, wherein the substitute image data comprises a three-dimensional shape, and further comprising:

determining a first perspective associated with a viewing angle of the original image data; and determining a perspective of the three-dimensional shape corresponding to the first perspective, wherein the modified image data comprises the three-dimensional shape, and the modified image data is positioned in the original image data such that the perspective of the three-dimensional shape corresponding to the first perspective is displayed.

11. The computer implemented method of claim 5, further comprising:

determining a customer account associated with the reference marker;

determining, based on data associated with the customer account, that third-party image data is authorized for display;

determining third-party image data available for display; and causing the third-party image data to be displayed along with the modified image data and the original image data, wherein the third-party image data is overlaid in the modified image data, the position of the third-party image data based at least on the contour marking.

12. The computer implemented method of claim 5, wherein the contour marking is printed on the article of clothing such that the contour marking is not visible to the unaided human eye.

13. The computer implemented method of claim 5, wherein the reference marker comprises data being transmitted wirelessly from a device associated with the article of clothing.

14. The computer implemented method of claim 5, wherein the original image data comprises image data captured by a camera or image data displayed on a display device.

15. The computer implemented method of claim 5, wherein the substitute image data comprises at least one of a pattern, an article of clothing, text, an image, a video, a three-dimensional rendering of an object, or an animated image.

16. A system, comprising:
   at least one processor;
   memory including instructions that, when executed by the processor, cause the computing system to:
   receive original image data containing a representation of an article of clothing, the article of clothing having a data source reference marker physically proximate to the article of clothing and a contour marking corresponding to an outline of the article of clothing;
   determine substitute image data based at least in part on the reference marker;
   generate modified image data corresponding to a modification of the representation of the article of clothing in the original image data, the modification of the representation of the article of clothing based at least in part on the substitute image data; and
   cause the modified image data to be displayed with the original image data,
   wherein the modified image data is overlaid in the original image data, the position of the modified image data based at least on the reference marker and the contour marking.

17. The system of claim 16, wherein the instructions, when executed, further cause the system to:
   receive query data comprising data associated with the reference marker;
   determine, based at least in part on the query data, a set of potential substitute image data;
   cause a selection of the substitute image data from the set of potential substitute image data, the selection based at least in part on the reference marker and criteria associated with the substitute image data.

18. The system of claim 17, wherein the instructions, when executed, further cause the system to:
   determine an identity of a viewer of the original image data;
   determine that the criteria associated with the substitute image data comprises approved identities of potential viewers; and
   determine that the identity of the viewer matches one of the approved identities.

19. The system of claim 16, wherein the instructions, when executed, further cause the system to:
   determine, in the original image, a replacement area substantially defined by the contour marking;
   analyze the substitute image data to determine a correspondence between the substitute image data and the replacement area; and
   cause a positioning of the substitute image data such that the replacement area is substantially filled with the substitute image data, such that the contour marking is not visible.

20. The system of claim 16, wherein the instructions, when executed, further cause the system to:
   determine a first perspective associated with a viewing angle of the original image data; and
   determine a perspective of the three-dimensional shape corresponding to the first perspective,
   wherein the modified image data comprises the three-dimensional shape, and the modified image data is positioned in the original image data such that the perspective of the three-dimensional shape corresponding to the first perspective is displayed.

* * * * *